(12) United States Patent
Geissler et al.

(10) Patent No.: US 11,189,101 B2
(45) Date of Patent: Nov. 30, 2021

(54) LIGHTING INTEGRATION

(71) Applicant: Mo-Sys Engineering Limited, London (GB)

(72) Inventors: Michael Paul Alexander Geissler, London (GB); Martin Peter Parsley, London (GB)

(73) Assignee: Mo-Sys Engineering Limited, London (GB)

( * ) Notice: Subject to any disclaimer, the term of this patent is extended or adjusted under 35 U.S.C. 154(b) by 0 days.

(21) Appl. No.: 16/755,536

(22) PCT Filed: Oct. 12, 2018

(86) PCT No.: PCT/GB2018/052927
§ 371 (c)(1),
(2) Date: Apr. 10, 2020

(87) PCT Pub. No.: WO2019/073245
PCT Pub. Date: Apr. 18, 2019

(65) Prior Publication Data
US 2020/0410765 A1 Dec. 31, 2020

(30) Foreign Application Priority Data
Oct. 13, 2017 (GB) .................................... 1716896

(51) Int. Cl.
*G06T 19/00* (2011.01)
*G06T 7/73* (2017.01)
(Continued)

(52) U.S. Cl.
CPC .............. *G06T 19/006* (2013.01); *G06T 7/73* (2017.01); *G06T 15/506* (2013.01);
(Continued)

(58) Field of Classification Search
None
See application file for complete search history.

(56) References Cited

U.S. PATENT DOCUMENTS

| 6,342,887 | B1  | 1/2002 | Munroe  |           |
|-----------|-----|--------|---------|-----------|
| 6,556,722 | B1* | 4/2003 | Russell | G01S 5/16 |
|           |     |        |         | 348/94    |

(Continued)

FOREIGN PATENT DOCUMENTS

| EP | 0954169 A2 | 11/1999 |
| EP | 2962284 B1 | 6/2018  |

(Continued)

OTHER PUBLICATIONS

International Search Report and Written Opinion from PCT Application No. PCT/GB2018/052927, dated Nov. 27, 2018, pp. 1-13.

(Continued)

*Primary Examiner* — Ryan M Gray
(74) *Attorney, Agent, or Firm* — Haynes and Boone, LLP

(57) ABSTRACT

A method for forming augmented image data, the method comprising: forming a primary image feed showing a subject illuminated by a lighting unit; estimating the location of the lighting unit; receiving overlay data defining an overlay of three-dimensional appearance; rendering the overlay data in dependence on the estimated location to form an augmentation image feed; and overlaying the augmentation image feed on the primary image feed to form a secondary image feed.

8 Claims, 3 Drawing Sheets

(51) Int. Cl.
   *G06T 15/50* (2011.01)
   *H04N 5/272* (2006.01)

(52) U.S. Cl.
   CPC .............. *G06T 2207/10016* (2013.01); *G06T 2215/16* (2013.01); *H04N 5/272* (2013.01)

(56) References Cited

U.S. PATENT DOCUMENTS

| | | | |
|---|---|---|---|
| 9,648,271 B2* | 5/2017 | Partouche | G06T 13/20 |
| 10,692,288 B1* | 6/2020 | Rasmussen | A63F 13/213 |
| 2005/0099603 A1* | 5/2005 | Thomas | G03B 15/06 |
| | | | 352/85 |
| 2005/0151850 A1* | 7/2005 | Ahn | H04N 5/2256 |
| | | | 348/207.99 |
| 2006/0165310 A1* | 7/2006 | Mack | H04N 5/272 |
| | | | 382/284 |
| 2007/0248283 A1* | 10/2007 | Mack | G06T 5/002 |
| | | | 382/284 |
| 2009/0262217 A1* | 10/2009 | Mack | H04N 5/272 |
| | | | 348/239 |
| 2010/0045792 A1* | 2/2010 | Bernard | G01V 8/10 |
| | | | 348/143 |
| 2014/0267270 A1 | 9/2014 | Pappoppula et al. | |
| 2016/0364914 A1 | 12/2016 | Todeschini | |
| 2017/0061691 A1 | 3/2017 | Scott et al. | |

FOREIGN PATENT DOCUMENTS

| | | |
|---|---|---|
| GB | 2399248 A | 9/2004 |
| WO | 2013154688 A2 | 10/2013 |
| WO | 2014075019 A2 | 5/2014 |
| WO | 2018045759 A1 | 3/2018 |
| WO | 2018200337 A1 | 11/2018 |

OTHER PUBLICATIONS

Great Britain Search Report from GB1716896.4, dated Apr. 11, 2019, pp. 1-4.

* cited by examiner

LIGHTING INTEGRATION

RELATED APPLICATIONS

This application is a 371 National Stage of International Patent Application No. PCT/GB2018/052927 filed Oct. 12, 2018, entitled "LIGHTING INTEGRATION," which claims priority to British Patent Application No. 1716896.4 filed Oct. 13, 2017, entitled "LIGHTING INTEGRATION," both of which are herein incorporated by reference in their entirety.

This invention relates to harmonising the appearance of lighting in, for example, video production.

It is known to film actors, presenters, animated models and other physical objects against a background of a known colour. Conventionally that background is a green screen. Then the resulting video feed can be edited to replace the green background with other artefacts such as scenery, computer-generated animation or statistical charts, creating an augmented video feed. When the overlain artefacts have a three-dimensional appearance, if they are lit differently from the presenters then that can reduce the realism of the final product.

It would be desirable to be able to produce realistic augmented video or still photographic products more easily.

According to the present invention there is provided a method/apparatus as set out in the accompanying claims.

The present invention will now be described by way of example with reference to the accompanying drawings.

Figure 1:
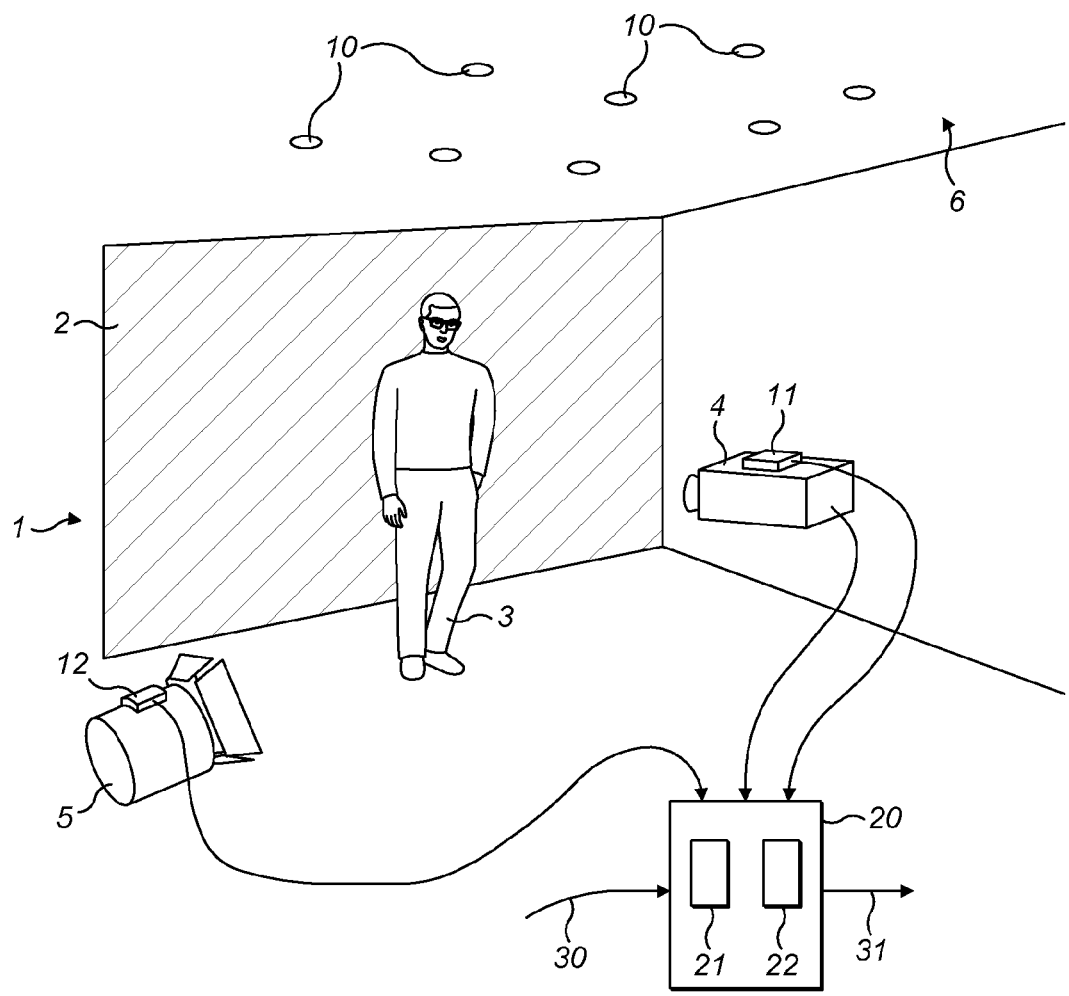
FIG. 1 shows a system for implementing a video overlay.

The system of FIG. 1 comprises a studio 1 having a background 2 of a known colour or pattern. In this case the background is a green screen. A subject 3, which in this case is a presenter, is located in front of the green screen. A camera 4 is located so as to photograph the subject 3 against the background 2. In this case the camera is a video camera which generates a video feed of its view of its field of view, but it could be a still camera which generates a photograph of the field of view. The camera is located so that its field of view includes the subject and at least some of the background. The camera may be hand-held, floor mounted or supported in any other convenient way. Conveniently, the camera is movable within the studio. A lighting unit 5 is located in the studio. The lighting unit is positioned to illuminate the subject. The lighting unit could be implemented in any convenient way. It could be floor-mounted, ceiling-mounted or hand-held. Conveniently, the lighting unit is movable within the studio. The camera and/or the lighting unit could move while filming is taking place. There could be multiple cameras each generating a respective video feed. There could be multiple cameras illuminating the subject simultaneously.

When filming is taking place, the lighting unit is positioned to illuminate the subject from the desired angle and the camera is positioned to film the subject from the desired angle. Then the subject performs in the appropriate manner while being filmed by the camera. The camera forms a video feed of the performance. In the video feed the subject is seen against the known background 2.

The camera 4 and the lighting unit 5 are provided with mechanisms to allow their positions in the studio to be estimated. Those mechanisms could be radio location systems, e.g. using time of flight between the camera/lighting unit and beacons in known locations to trilaterate the locations of the camera and the lighting unit. More preferably, the camera and the lighting unit are provided with positioning systems as described in EP 2 962 284.

Indicia 10 are applied to objects in the studio 1. In this example the indicia are applied to the ceiling 6 of the studio. The indicia are preferably of an appearance that is readily distinguishable from the environment. For example, they may be of very high reflectivity (e.g. of retroreflective material) or of very low reflectivity (e.g. having a matt black surface coating), or they may be of a defined colour, for example a specific green. When the indicia are of high reflectivity, preferably each one is of a material that reflects preferentially in a direction orthogonal to its major plane, as may be the case with dedicated retroreflective materials. The indicia are preferably flat: for example, they may be in the form of laminar stickers applied to one or more surfaces. This can make them easy to apply in the environment. The indicia preferably bear no surface markings (e.g. numbers or bar codes) by which each one can be distinguished from the others. This can make the task of applying the indicia in the environment easier. The indicia may all have the same outline (e.g. round or square) or they may have different outlines. The indicia are positioned in an irregular pattern. The pattern is preferably non-repeating. This may be achieved by randomly positioning the indicia in the environment. Positioning the indicia in an irregular pattern can make the task of applying the indicia easier and also facilitates locating objects in the environment, as will be described below. The indicia may all be of the same size, which may help their range to be determined as will be described further below, or of different sizes. In summary, in a preferred arrangement the indicia are provided by identical retroreflective stickers which are applied to the environment in an irregular or random pattern.

Figure 2:
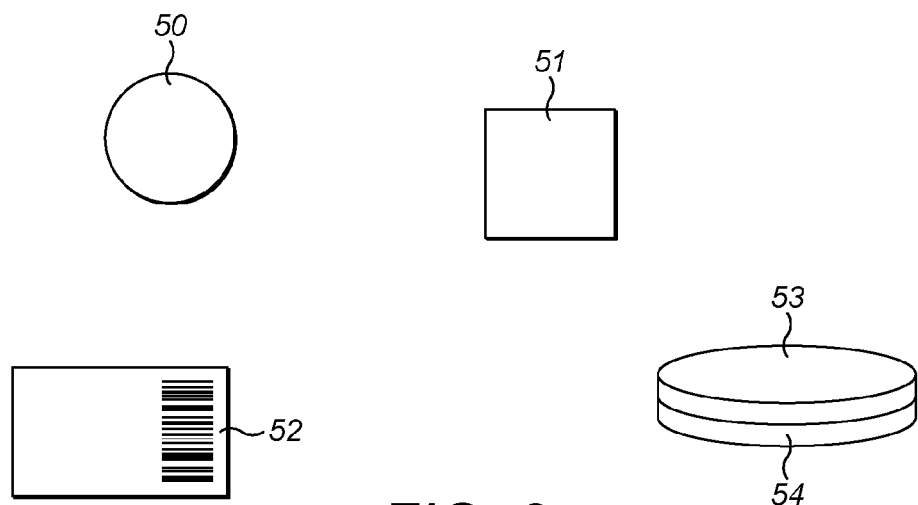
FIG. 2 shows examples of indicia.

FIG. 2 shows examples of indicia. The indicia could be round (see 50), square (see 51) or of other shapes. The indicia could bear markings such as barcode 52 which allow any of the indicia to be distinguished uniquely from the others, or they may bear no such markings. Conveniently the indicia take the form of stickers having an upper surface 53 of a predetermined colour and/or reflectivity and a lower adhesive surface 54 by means of which they may be adhered to the environment.

The indicia may be located on upwards-facing, downwards-facing or sideways-facing surfaces of the environment. It is preferred that at least some of the indicia are located on downwards-facing surfaces, e.g. ceiling 6. Such a downward-facing surface may be above the camera 4 or lighting unit 5. Visibility of indicia located above a detector 11, 12 is typically better than of indicia located sideways of or below the detector because it is less likely to be obstructed by other objects or people.

The camera and the lighting unit each carry a respective positioning device 11, 12. The positioning device comprises an imaging device such as a camera. The camera of the positioning unit is configured to capture images in a direction generally away from the camera/lighting unit. Images, e.g. video frames, gathered by the camera are processed to estimate the location of the respective positioning unit. From that location the location of the device (camera/lighting unit) carrying the respective positioning unit can be inferred.

The camera of a positioning device and the indicia 10 enable the location of the positioning device to be estimated in the studio/environment. The manner in which this is achieved will now be described with reference to FIG. 3.

Figure 3:
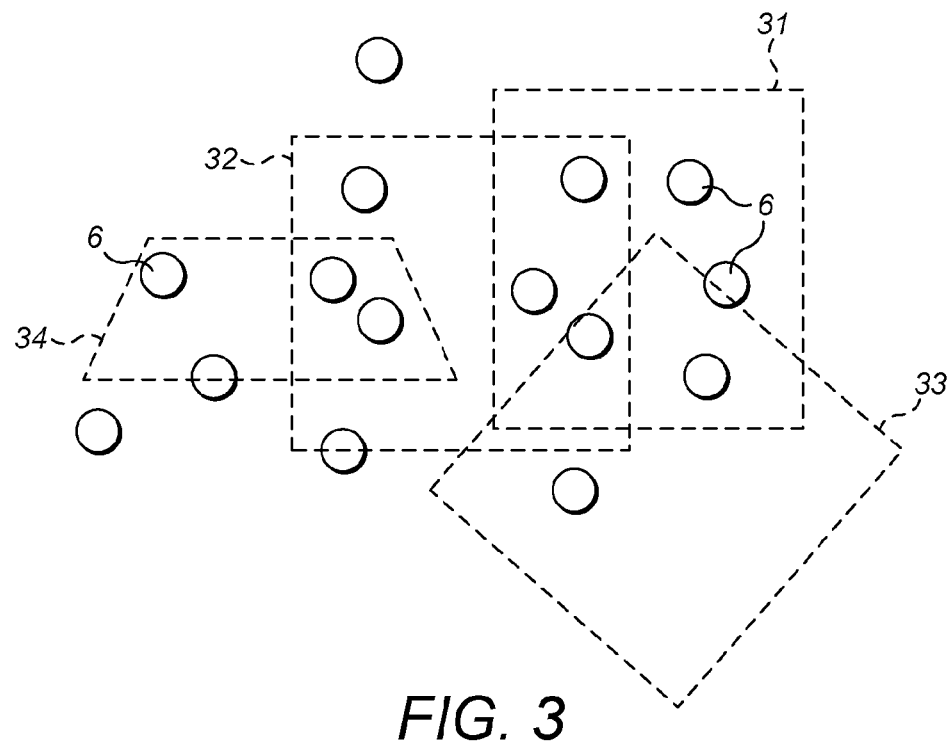
FIG. 3 shows a pattern of indicia in an environment and frames captured by an imaging device such as a camera.

The camera of a positioning unit 11/12 captures a series of frames. The direction in which the camera of the positioning unit is pointing when it captures a frame depends on how the object carrying the respective positioning unit body is positioned at that time. FIG. 3 shows indicia 6 in an irregular pattern, and a set of outlines 31, 32, 33, 34 indicating the boundaries of frames captured by the camera of a positioning unit. The positioning unit comprises a processor and a memory. The memory stores in non-transitory form a set of instructions executable by the processor to perform its functions. The processor receives the successive frames captured by the camera of the positioning unit. The processor analyses each frame to detect the locations of the indicia 6 as represented in the frame. The indicia may be detected through their characteristic brightness, shape, colour or a combination of those factors. For example, in the case of retroreflective indicia the indicia may be indicated by particularly bright pixel groups in the image.

By comparing the position and layout of the indicia as detected in successive frames the processor can (a) build up a map of the pattern or constellation formed by the indicia and (b) infer the motion of the positioning unit between frames. For illustration, suppose at a first time the camera captures the image indicated at 31. The processor identifies the indicia 6 in that image. The indicia can be considered to lie on vectors extending from the camera and intersecting the locations of the indicia as represented in image 31. At this stage the ranges of the indicia from the camera are not known. At a second time the camera captures the image indicated at 32. Some indicia are common to images 31 and 32. Because the indicia are positioned irregularly it can be assumed that the relative positions of the indicia found in each frame are unique in the field of indicia. By comparing the positions of the images of indicia in successive frames the processor can build up a record of where in a three-dimensional space the actual indicia are. For example, because three indicia 6 appear in a common spatial relationship in frames 31 and 32 it can be inferred that the camera has undergone translation between those images without rotation or tilting. Comparison of the positions of the indicia in frame 33 with those in the other frames 31, 32 whose fields of view overlap frame 33 permit the processor to infer that the positioning unit was rotated about its primary axis before frame 33 was captured. Comparison of the positions of the indicia in frame 34 with those in the other frames (e.g. 32) whose fields of view overlap frame 34 permit the processor to infer that the positioning unit was tilted before frame 33 was captured. Similarly, motion of the positioning unit towards or away from the field of indicia can be detected through scaling of the detected positions of the indicia between successive frames.

The accuracy of this positioning method can be improved if the camera of the positioning unit has a relatively wide field of view and/or if the density of the field of indicia is such that numerous indicia can be expected to be captured in each frame. That makes it less likely that there will be positional ambiguity due to multiple indicia accidentally having a similar positional relationship and therefore being confused as between images. That also reduces the influence of other objects that might appear similar to indicia (e.g. lights) and that might move. In solving for the position of the camera, the processor searches for the best fit to the collected data, but that fit might not be perfect: for example it might not fit to a mobile light that has been mistakenly identified as one of the indicia.

The position of indicia in an image indicates the direction of those indicia with respect to the camera of the positioning unit but not necessarily their distance from the camera. It may be possible for the processor of the positioning unit to infer the distance to indicia from the size with which they appear in the image. Alternatively, or in addition, the distance to indicia may be inferred from the changes in the imaged positions of indicia as between frames. The processor solves a multi-variable problem in which the relative directions from the camera of the positioning unit to the indicia in successive frames are known. The processor determines a map of the indicia that provides the best fit to the information collected in successive frames as to the directions of indicia from the camera. Having formed the map, it estimates the position of the camera with reference to that map by identifying a position and orientation from which a view of the mapped indicia would be expected to best match the indicia as identified in the latest image from the camera. This problem can be simplified if it is known with greater confidence that the same one of the indicia as is represented at a location in a first frame is also represented at a location in a second frame. This relationship can be achieved by one or both of: (i) the rate at which the frames are captured being sufficiently high that one or more indicia will typically appear in successive frames, and can therefore be tracked by the processor; and (ii) the processor searching for common spatial patterns among the indicia as imaged, which indicate that the same set of indicia have been imaged in different frames.

It would be possible for the processor to be pre-programmed with the locations of the indicia, but it has been found that with a constellation of indicia of suitable density this is not necessary because the processor can learn their locations satisfactorily. It may, however, assist in permitting a translational and/or rotational offset between a position determined by the positioning unit and a reference location/orientation in the studio to be determined. Alternatively, that can be determined by placing the positioning unit at a known location and/or orientation in the studio, and then tracking its subsequent motions.

It would be possible for the indicia to be provided with distinctive markers, to help the processor distinguish the images of different indicia from each other. Those could for example be numbers or bar codes, or the shape or colour of different indicia may differ so that they can be differentiated.

Using the process described above, the processor detects and tracks motion of the camera.

The positioning systems 11, 12 provide outputs indicating the locations of the camera and the lighting unit over time.

The primary video feed from the camera 4 and the position data from the positioning systems 11, 12 are provided to a controller 20. The controller comprises a processor 21 and a memory 22. The memory stores in a non-transitory way code that is executable by the processor to cause the controller to perform the functions described of it herein.

Overlay data is received by the controller at 30. The overlay data represents visual information that is to replace the background in the primary video feed. The overlay data could be one or more still images or it could be a video feed, or it could be data defining computer-generated imagery such as animations. Preferably, the overlay data defines one or more three-dimensional objects that can be rendered by the controller 20. The overlay data could define the size, attitude and surface texture of such objects, and their position relative to a reference point. The reference point could be defined with reference to the studio, the camera, the lighting unit or the presenter.

The overlay data may define a background image and foreground data. In one example the foreground data may comprise a series of cuboid shapes in assorted colours which are intended to form a bar chart. The presenter may be positioned to one side of the camera's field of view, leaving the green screen exposed on the other side of the field of view. (See FIG. 4). The overlay data may be intended to be used so that: (1) the background image forms a background, replacing the green screen anywhere that the foreground overlay data is not present and (2) the foreground overlay data is visible over some of the green screen, showing the cuboid shapes in their locations as defined in the overlay data and with their appearance as defined by the overlay data. (See FIG. 5).

Figure 4:
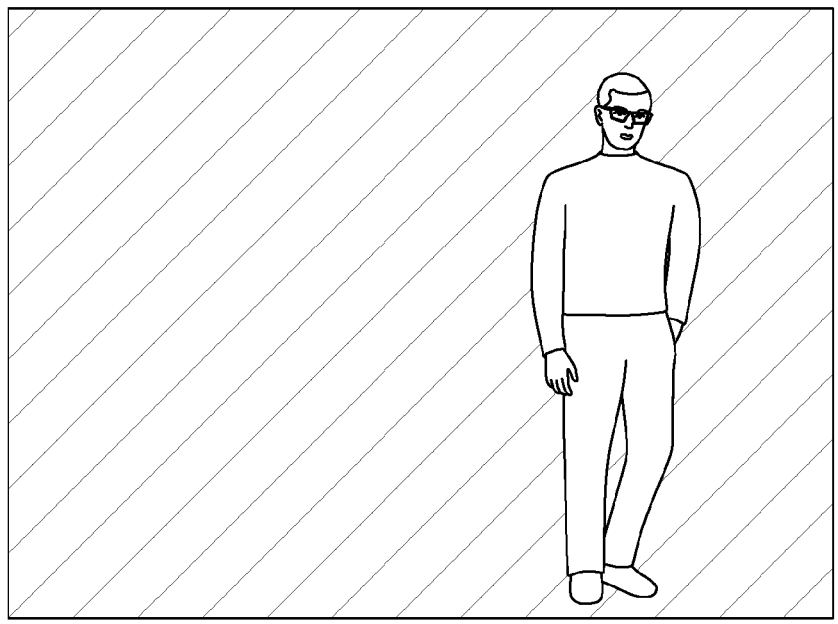
FIG. 4 shows a frame of captured video.
Figure 5:
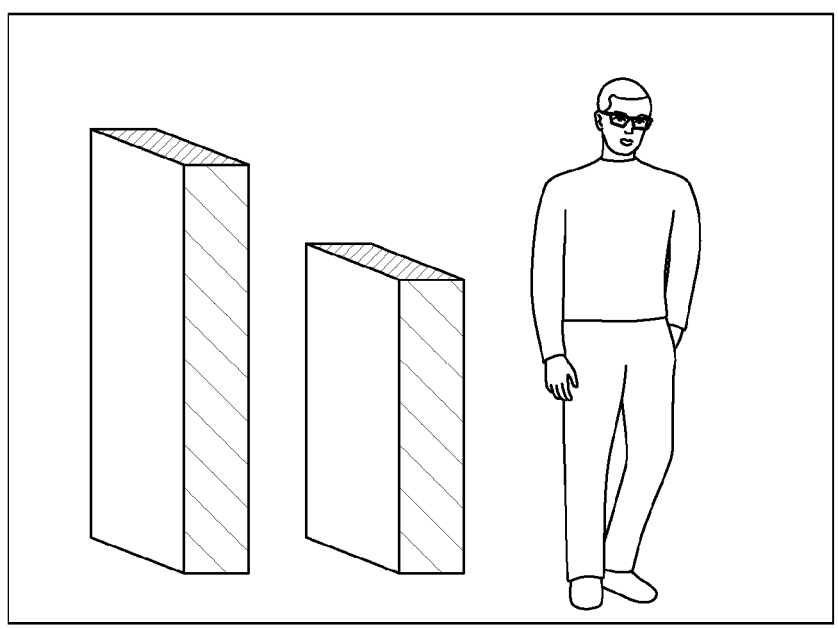
FIG. 5 shows a frame of augmented video.

The controller receives the primary video feed, renders the overlay data and forms a secondary video feed at 31 in which the primary video feed and the overlay data are combined. FIG. 4 represents a frame of the secondary video feed corresponding to the frame of primary video shown in FIG. 5.

In rendering the secondary video feed, the controller applies a lighting effect to three-dimensional objects defined in the overlay data. It does that by using any conventional lighting algorithm to texture the three-dimensional objects. Such an algorithm can render the textures to be shown on the surfaces of the objects to simulate their illumination from a lighting source whose direction or location with respect with to the respective object is known.

The controller uses the position data from positioning systems 11, 12 to determine the direction/location of the virtual lighting to use in rendering the objects. In a simple example, the controller knows from the position data the location of the lighting unit 5 relative to a predefined region of the studio in which the subject 3 is expected to be located. The controller then applies the lighting algorithm to texture the objects from the overlay data so as to give them the appearance, in the secondary video feed, of having been illuminated from the same lighting source. The controller may also take the location of the camera into account, so that the lighting will appear to remain consistent as between the subject and three-dimensional objects in the overlay data as the camera moves.

The precise method in which the controller computes the location of the virtual lighting source depends on what reference position is selected for the positions of the camera and lighting unit to be reported with respect to. Conveniently, a reference location in the studio is pre-defined. Then the positions of the camera and lighting unit can be given with respect to that location and also the virtual positions of the foreground elements in the overlay data can be defined with respect to the same reference location.

The background in the primary video feed need not be known. The overlay data could be overlain on a predetermined region of the primary video feed irrespective of what was present there.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention

The invention claimed is:

1. A method for forming augmented image data, the method comprising:
   forming a primary image feed showing a subject illuminated by a lighting unit;
   estimating the location of the lighting unit in the environment, wherein the lighting unit carries an imaging device and the location of the lighting unit is estimated by receiving a series of images of the environment captured by the imaging device and forming, in dependence on the images an estimate of the lighting unit's position in the environment;
   detecting in the images captured by the imaging device the representation of each of a plurality of indicia located in the environment;
   determining the locations of each of the plurality of indicia as represented in the images and forming the said estimate of position by comparing the locations of representations of the indicia in images captured at different times;
   receiving overlay data defining an overlay of three-dimensional appearance;
   rendering the overlay data in dependence on the estimated location to form an
   augmentation image feed; and
   overlaying the augmentation image feed on the primary image feed to form a secondary image feed.

2. The method as claimed in claim 1, comprising detecting the representation of each of the indicia in the image as a relatively high brightness region of the image.

3. The method as claimed in claim 1, comprising disposing the plurality of indicia in an irregular pattern in the environment.

4. The method as claimed in claim 1, wherein the indicia are retroreflective.

5. The method as claimed in claim 3, wherein the indicia are substantially identical.

6. The method as claimed in claim 3, wherein the indicia are located on a downwards-facing surface of the environment.

7. The method as claimed in claim 1, wherein rendering the overlay data is performed so that, in the secondary image feed, the angle from which regions derived from the augmentation image appear to be lit matches the angle from which regions derived from the primary image feed are lit by the lighting unit.

8. An apparatus configured to perform the steps of claim 1.

* * * * *